T. A. BROOKS.
GAS SCREEN.
APPLICATION FILED JULY 11, 1919.
1,350,700.                                    Patented Aug. 24, 1920.
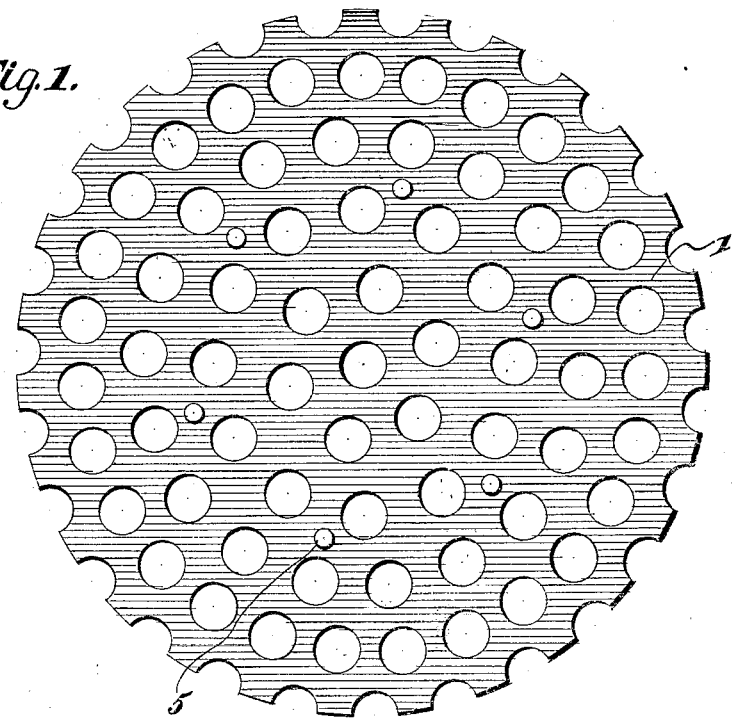
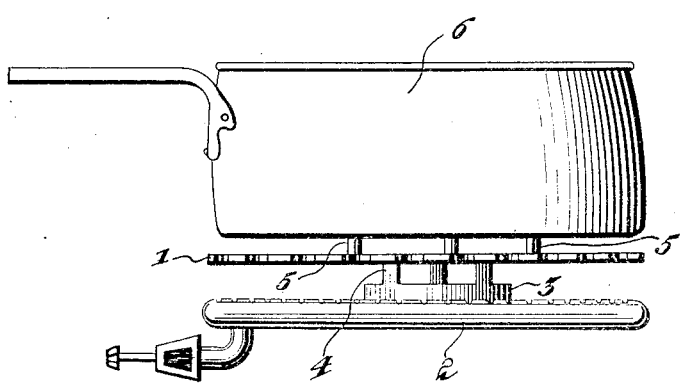
WITNESSES:
Inventor
Thomas A. Brooks.
By
Attorney

UNITED STATES PATENT OFFICE.

THOMAS ABRAHAM BROOKS, OF NEWTON, KANSAS.

GAS-SCREEN.

1,350,700.  Specification of Letters Patent.  Patented Aug. 24, 1920.

Application filed July 11, 1919. Serial No. 310,067.

*To all whom it may concern:*

Be it known that I, THOMAS A. BROOKS, a citizen of the United States, and a resident of Newton, in the county of Harvey and State of Kansas, have invented certain new and useful Improvements in Gas-Screens, of which the following is a specification.

My invention is an improvement in gas screens, and has for its object to provide a device of the character specified adapted for use in connection with gas burners, for spreading and intensifying the flame.

In the drawings:

Figure 1 is a plan view of the invention;

Fig. 2 is a side view of the same in use;

Fig. 3 is a perspective view of the support for the screen;

In carrying out my invention, I provide a perforate disk 1, the said disk or screen being formed from plate metal having a series of circular perforations. The disk is supported above the burner 2, which is of ordinary construction, by means of a ring 3, the ring resting upon the burner and having upstanding arms or struts 4 which engage the under face of the screen to support the same.

The screen is provided on its upper face with a series of upwardly extending lugs or pins 5, upon which the vessel 6 to be heated rests, the said pins or lugs supporting the vessel out of contact with the screen.

In use, the screen becomes very highly heated by the flame, thus holding and intensifying the heat and assisting in the thorough combustion of the gas by thoroughly mixing it with the air.

The screen is used on any kind of stove, placing the vessel to be heated on the top of the stove, in the ordinary manner, except when gas pressure is extremely low. Then the vessel can be placed on the lugs of the screen. By using the screen more air can be admitted through the air mixer on the burner, giving a higher rate of combustion.

I claim:

A device of the character described comprising a circular disk adapted to be supported above a burner and provided with a plurality of series of circular holes of uniform size and spaced apart at equal distances, the outermost series of holes having their centers lying at the periphery of the disk and being only semi-circular whereby the periphery of the disk will be serrated, a circular series of lugs rising from said disk, and a ring with upwardly projecting arms for supporting said disk.

THOS. ABRAHAM BROOKS.